United States Patent [19]

McGuire

[11] Patent Number: 5,511,301

[45] Date of Patent: Apr. 30, 1996

[54] SELF RETAINING FASTENER

[75] Inventor: James T. McGuire, Byron, Ill.

[73] Assignee: Textron Inc., Providence, R.I.

[21] Appl. No.: 279,435

[22] Filed: Jul. 25, 1994

[51] Int. Cl.$^6$ .......................... B21D 39/00; F16B 33/00; F16B 43/00

[52] U.S. Cl. .......................... 29/456; 411/368; 411/533; 411/999

[58] Field of Search .......................... 411/107, 368, 411/369, 533, 965, 999; 29/525.1

[56] References Cited

U.S. PATENT DOCUMENTS

| | | | |
|---|---|---|---|
| 1,927,780 | 9/1933 | Anderson | 411/533 X |
| 2,460,613 | 2/1949 | Whelan et al. | 411/533 X |
| 3,018,127 | 1/1962 | DoGrosielski et al. | 411/999 X |
| 3,378,806 | 4/1968 | Wilkerson et al. | 411/999 X |
| 3,426,321 | 2/1969 | Peterson, Jr. | 411/999 X |
| 3,472,303 | 10/1969 | Beard | 411/999 X |
| 3,556,570 | 1/1971 | Cosenza | 411/999 X |
| 3,878,042 | 4/1975 | Curulla et al. | 411/999 X |
| 3,913,649 | 10/1975 | Stanaitis . | |
| 4,157,725 | 6/1979 | Stanaitis . | |

*Primary Examiner*—Neill R. Wilson
*Attorney, Agent, or Firm*—Trexler, Bushnell, Giangiorgi & Blackstone, Ltd.

[57] ABSTRACT

A fastener is mounted in preassembly with a workpiece through an aperture in the workpiece. The fastener has a head and an elongate shank integrally formed therewith. The shank has a threaded portion and an unthreaded portion with the threaded portion having a major diameter which is greater than the inside diameter of the aperture in the workpiece and the unthreaded portion having an outside diameter which is less than the inside diameter of the aperture in the workpiece. To engage the fastener with the workpiece, the threaded portion is passed through the aperture to dispose the unthreaded portion within the aperture. When the fastener is engaged with the aperture, a partial internal thread is formed therein which does not materially enlarge or decrease the effective inside diameter of the aperture. The difference between the inside diameter of the aperture and the major diameter of the threaded portion provides a degree of interference which maintains the fastener in a preassembled condition with respect to the workpiece.

4 Claims, 2 Drawing Sheets

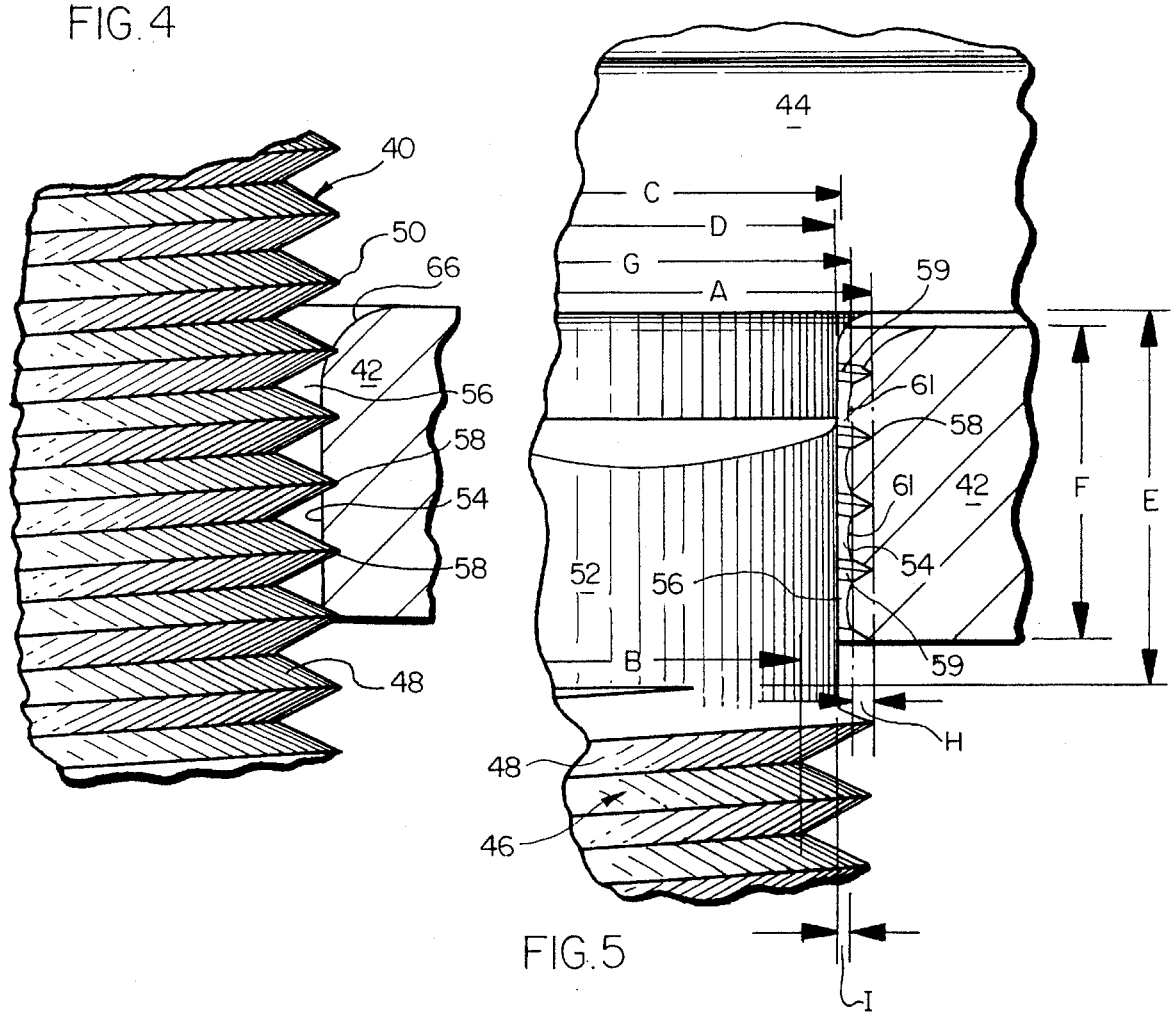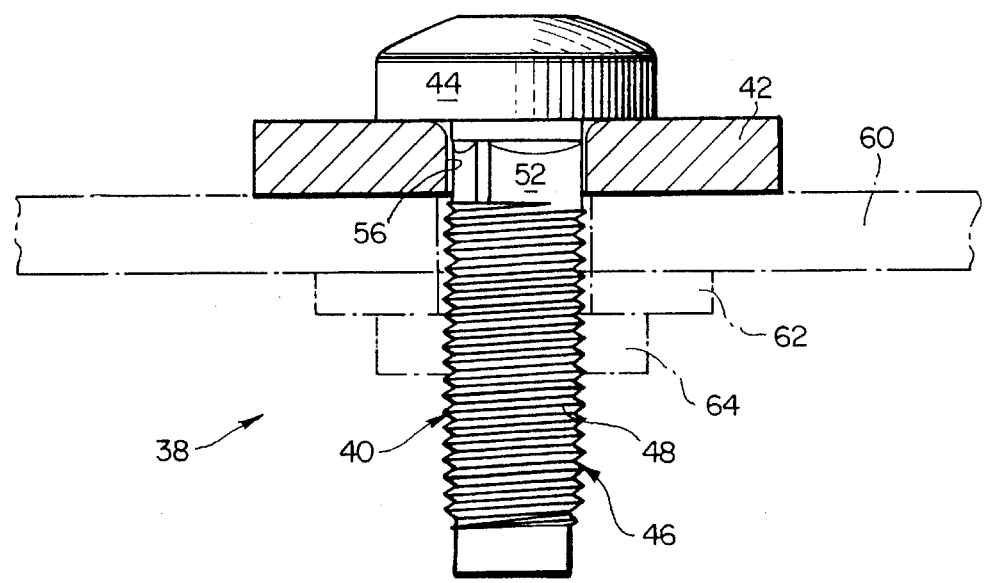

5,511,301

SELF RETAINING FASTENER

BACKGROUND OF THE INVENTION

This invention is generally directed to a fastener assembly which includes a fastener preassembled to a workpiece. More particularly, the invention contemplates a fastener which is threaded through an initially unthreaded aperture in a workpiece to form a partial thread along the internal surface of the aperture; the fastener having a threaded portion which has a major diameter which is greater than the inside diameter of the aperture and an unthreaded portion which has an outside diameter which is less than the inside diameter of the aperture.

Many users, in particular manufactures in the automobile industry, employ preassemblies wherein a fastener is preassembled to a component used in numerous installations or joints in the manufacture of their products. In some prior manufactures of preassembled fastener assemblies, the fastener assembly generally includes a fastener, such as a bolt, which is initially formed from a blank having an unthreaded portion of a generally constant diameter. After the unthreaded blank is positioned through an unthreaded aperture in a workpiece, the portion of the blank which extends outwardly from the workpiece is subjected to a thread forming process, such as cold rolling wherein a thread or helix is formed on the shank thereof. This type of threading procedure produces an upsetting of the material and reworking thereof to produce a desired thread form. In the cold rolling of the thread, the major diameter of the resulting thread form produced is greater than the original cross-sectional dimension of the unthreaded blank, while the minor diameter is less than the original cross-sectional diameter. This type of product is well-known in the art and is normally referred to as a "sems-type assembly."

A disadvantage in this type of preassembly is that the fastener must be cold worked or rolled after the fastener has been placed through the workpiece, and the size of the workpiece is limited. This increases the cost of manufacture since the thread forming must be done after assembly.

Another type of manufacture for preassembling a fastener to a workpiece is shown in FIG. 1 and will be described in detail herein. Generally, a fastener having a head and an elongate, threaded shank depending therefrom is provided. The threaded shank of the fastener is passed through an unthreaded aperture in a workpiece of any size until the workpiece is positioned adjacent to the head. The unthreaded aperture in the workpiece has an inside diameter which is greater than the major diameter of the threaded shank so that the threaded shank passes freely therethrough.

Thereafter, a push nut is forced over the length of the threaded shank until the push nut lies a predetermined distance from the workpiece. The push nut is generally frusto-conical in shape, and includes a plurality of teeth depending downwardly from a radially outer rim. The teeth contact the threads of the fastener to securely hold the push nut on the fastener. The push nut has an outer diameter which is larger than the aperture in the workpiece so that the fastener can move relative to the workpiece, but remains preassembled.

A significant disadvantage to this type of assembly is that the push nut must be provided which increases the cost of the overall assembly since a component must be provided in addition to the fastener. Additionally, the cost of manufacturing is increased since a push nut must be provided. Furthermore, when the fastener assembly is fastened to a further structure with the push nut being left in the joint, potential problems are created with the clamp load. That is to say that the presence of the push nut in the joint may prevent the workpiece component of the assembly from being properly clamped to the underlying structure.

The novel fastener assembly of the present invention is intended to overcome or minimize these problems and other inherent problems in the prior art and does so while retaining ease of manufacture, dependability and relatively low cost.

OBJECTS AND SUMMARY OF THE INVENTION

A general object of the present invention is to provide a fastener assembly which includes a fastener member, such as a bolt or a screw, that is mounted in preassembly with a workpiece.

An object of the present invention is to provide a fastener assembly which includes a fastener member having an elongate shank with an unthreaded portion and a threaded portion that iS mounted in preassembly through an initially unthreaded aperture in a workpiece.

Another object of the present invention is to provide a fastener assembly which can be manufactured with ease and low cost.

Briefly, and in accordance with the foregoing, the present invention discloses a fastener which is mounted in preassembly with a workpiece through an initially unthreaded aperture in the workpiece. The fastener has a head and an elongate shank integrally formed therewith. The shank has a threaded portion and an unthreaded portion. The threaded portion has a major diameter which is 5% to 30% greater than, and preferably 10% to 25% greater than, the inside diameter of the aperture in the workpiece. The unthreaded portion has an outside diameter which is less than the inside diameter of the aperture in the workpiece and a length which is greater than, preferably 1.2 times greater than, the thickness of the workpiece.

To engage the fastener with the workpiece, the threaded portion is engaged with the workpiece aperture while the fastener is rotated to dispose the unthreaded portion within the aperture. When the fastener is rotated and passed through the aperture, a partial internal thread is formed along the interior surface of the aperture while not materially enlarging or decreasing the effective inside diameter of the aperture. The difference between the inside diameter of the aperture and the major diameter of the threaded portion provides a degree of interference which maintains the fastener in a preassembled condition with respect to the workpiece.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 4 is a partial view of the fastener and workpiece of FIG. 3 which has been enlarged for clarity;

FIG. 5 is the fastener and workpiece of FIG. 2 shown in a fully assembled configuration;

FIG. 6 is a partial view of the fastener and workpiece of FIG. 5 which has been enlarged for clarity.

DETAILED DESCRIPTION OF THE PREFERRED EMBODIMENT

Figure 1:
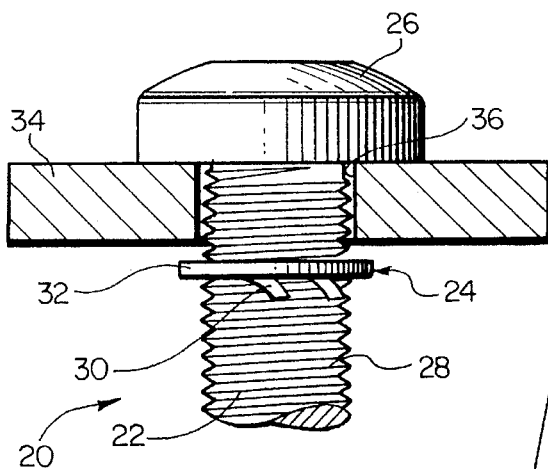
FIG. 1 is a partial elevational view of a fastener shown in preassembly with a workpiece which is shown in a partial cross-sectional view as disclosed in the prior art.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Turning now to the drawings, FIG. 1 illustrates one of the prior art types of fastener assemblies which is subject to the above discussed disadvantages. The fastener assembly 20 includes, generally, a bolt or screw member 22 having a captive frusto-conical toothed lock washer or push nut 24 thereon. The bolt member 22 is of a generally standard configuration, including a driving head 26 and a threaded portion 28 depending from the head 26. The push nut 24 is frusto-conical in shape, and includes a plurality of teeth 30 depending downwardly from the radially outer rim 32 and extending generally in the direction of the thread.

To assemble the bolt member 22 to a workpiece 34, the shank 28 of the bolt member 22 is passed through an unthreaded aperture 36 in the workpiece 34 until the workpiece 34 is positioned adjacent to the head 26. The unthreaded aperture 36 in the workpiece 34 has an inside diameter which is greater than the major diameter of the threaded shank 28 so that the shank 28 passes freely therethrough. Thereafter, the push nut 24 is forced over the length of the threaded shank 28 until the push nut 24 lies at a predetermined distance from the workpiece 34. The teeth 30 of the push nut 24 contact and bite into the threads of the bolt member 22 to securely hold the push nut 24 on the bolt member 22. The push nut 24 preferably does not clamp the head 26 of the nut 24 to the workpiece 34 so that the bolt member 22 can move relative to the workpiece 34.

This type of prior art assembly requires the use of the push nut 24 or the bolt member 22 will not be held in preassembly with the workpiece 34. The push nut 24 increases the cost of the assembly, both in the number of parts or components that are required and in the amount of time that it takes to preassemble the components. Also, as discussed above, the presence of the push nut 24 can adversely effect the final joint clamp load.

Attention is now directed to FIGS. 2–6, which shows the novel fastener assembly 38 of the present invention. The fastener assembly 38 includes a fastener member 40, such as a screw but preferably a bolt, which is attached to a workpiece 42 as described in detail herein. The fastener member 40 and the workpiece are made of suitable materials, such as metal.

The fastener member 40 includes a driving head 44, an elongated shank portion 46 comprised of a threaded portion 48 having threads 50 and an unthreaded portion 52. The unthreaded portion 52 is disposed intermediate of the driving head 44 and the threaded portion 48. The shank portion 46 of the fastener member 40 is of a known self-tapping configuration, such as a TAPTITE® or some other known threaded thread forming configuration for reasons described herein.

The thread form on the fastener member 40 may be formed by a known thread forming process, such as by cold forming or rolling a blank. When the blank is cold rolled, the screw helix or thread is formed on the shank portion. This thread forming process upsets the blank material and reworks the material to produce a desired thread form or helix, as distinguished from a machining operation which removes material from the blank to provide the thread form or helix. When the thread is cold rolled, the major or crest diameter of the resulting thread form produced is greater than the original cross-sectional dimension of the unthreaded blank, while the minor or root diameter is less than the original cross-sectional diameter.

The threaded portion 48 of the fastener member 40 that is formed by the cold rolling or by other suitable thread forming methods has a predetermined major or crest diameter, which is denoted by dimension "A" in FIG. 6, a predetermined minor or root diameter, which is denoted by dimension "B" in FIG. 6, and a predetermined pitch diameter, which is denoted by dimension "C" in FIG. 6, as described in detail herein. The unthreaded portion 52 has a predetermined outside diameter, which is denoted by dimension "D" in FIG. 6, and is of a predetermined length, which is denoted by the dimension "E". The major diameter A of the threaded portion 48 is greater than the outside diameter D of the unthreaded portion 52 for reasons described herein.

The workpiece 42 is of a predetermined thickness, denoted by the dimension "F" in FIG. 6, and includes a circular passage or aperture 54 having a predetermined inside diameter, denoted by the dimension "G" in FIG. 6. The passage or aperture 54 extends through the entire thickness of the workpiece 42. Thus, the length of the aperture 54 is the same length as the thickness of the workpiece 42. The aperture 54 is defined by a smooth, initially unthreaded, circular interior wall 56. While a workpiece 42 is illustrated in the drawings and referred to herein, it is to be understood that the fastener member 40 may also be engaged with an initially unthreaded nut or another initially unthreaded structural element.

The sizes of the components of the fastener assembly 38 are interrelated as described hereinbelow. The size of the major diameter A, minor diameter B and pitch diameter C of the threaded portion 48 of the fastener member 40 is interrelated with the size of the inside diameter G of the initially unthreaded aperture 54. The size of the major diameter A of the threaded portion 48 is interrelated with the size of the outside diameter D of the unthreaded portion 52. The size of the outside diameter D of the unthreaded portion 52 is interrelated with the inside diameter G of the aperture 54. Finally, the length E of the unthreaded portion 52 is interrelated with the thickness F of the workpiece 42, and thus, the length of the aperture 54.

How the various dimensions of the fastener member 40 and workpiece 42 are interrelated is best described when an explanation of how the fastener member 40 is assembled through the passage or aperture 54 in the workpiece 42. As such, attention is directed to FIGS. 2–6, which show a step-by-step procedure for assembling the novel fastener assembly 38 of the present invention.

Figure 2:
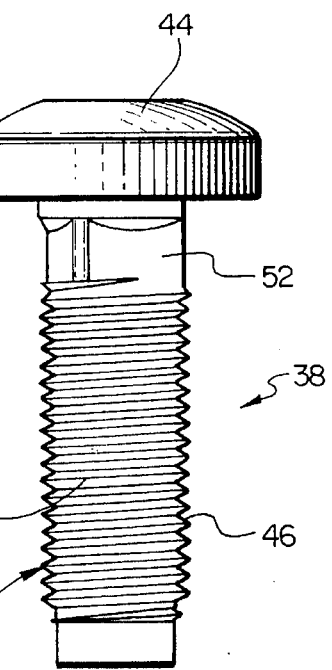
FIG. 2 is an exploded elevational view of a fastener and a workpiece according to the present invention.

First, the fastener member 40 and workpiece 42 as described herein are provided. As shown in FIG. 2, the circular interior wall 56 of the aperture 54 is initially smooth and unthreaded.

Figure 3:
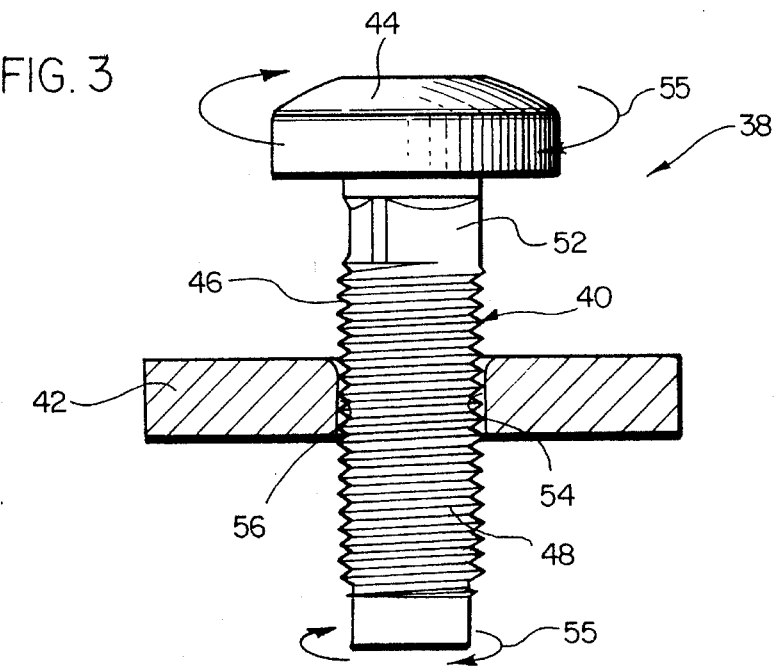
FIG. 3 is the fastener and workpiece of FIG. 2 shown in a partially assembled configuration as the fastener is rotated into engagement with the workpiece.

The threaded portion 48 of the elongate shank portion 46 is first engaged with the initially unthreaded aperture 54. The major diameter A of the threaded portion 48 is 5% to 30% greater than the inside diameter G of the aperture 54 and preferably 10% to 25% greater than the inside diameter G of the aperture 54. As shown in FIG. 3, in order to initially engage the threaded portion 46 with the aperture 54, the fastener 44 with it's threaded portion 46 is rotated or driven, as indicated at 55 by known, suitable means, such as an automated or hand operated driver, so that it rotates and translates through the passage or aperture 54.

As the threaded portion 46 of the shank portion 46 travels or rotates through the passage or aperture 54, the threads 50 form or achieve a purchase 58, as most clearly shown in FIG. 4, with the interior wall 56 of the aperture 54 and cold form or cold work a partial internal or female thread or helix 59, as most clearly shown in FIG. 6, on the interior wall surface 56 of the aperture 54. Since the self-tapping thread form is preferably tri-roundular, a partial thread 59 is created along the interior wall 56 of the aperture 54 without materially enlarging or decreasing the effective inside diameter of the aperture 54. When the interior wall 56 is cold formed, the wall material is slightly upset and material 61 is reworked and moved to points along the interior of the wall 56 to produce the desired partial internal thread form or helix. The material 61 that is moved defines an inside diameter of the aperture 54 that is slightly less than, but not materially less than, the initial inside diameter of the aperture 54. The threaded portion 48 of the shank portion 46 forms a purchase 58 into the interior wall 56 of the aperture 54 in the workpiece 42 of 5% to 30% and preferably 10% to 25% of the major diameter of the threaded portion 48. It is desired to achieve captivation or preassembly with the lowest amount of driving torque possible, taking into account the materials involved, the size of the workpiece and the overall application.

The threaded portion 48 has a pitch diameter C which is smaller than the inside diameter G of the aperture 54 in the workpiece 42. This prevents the aperture 54 from closing up during the cold working of the aperture 54 with the threaded portion 48.

The threaded portion 48 of the shank portion 46 travels completely through the passage or aperture 54 until the unthreaded portion 52 of the shank portion 46 is disposed or positioned within the aperture 52 as shown in FIG. 5. Since the outside diameter D of the unthreaded portion 52 is smaller than the major diameter A of the threaded portion 48 and smaller than the inside diameter G of the aperture 54, the unthreaded portion 52 fits within the aperture 54 after the threaded portion 48 has passed through the aperture 54, and permits subsequent rotation of the fastener 40 relative to the workpiece 42 in order to form a finished joint as illustrated in FIG. 5.

As shown in FIG. 6, the major diameter A of the threaded portion 48 is greater than the inside diameter G of the aperture 54 even after the threaded portion 48 has passed through the aperture 54. The difference between the inside diameter G of the now-threaded aperture 54 and the major diameter A of the threaded portion 48 provides a degree of interference, as shown by the dimension denoted by "H" in FIG. 6, which prevents the threaded portion 48 of the shank portion 46 from re-entering the aperture 54 and causes the fastener member 40 to be maintained in a preassembled condition with respect to the workpiece 42.

As also clearly illustrated in FIG. 6, the outside diameter D of the unthreaded portion 52 is less than the inside diameter G of the aperture 54 even after the aperture 54 has been cold worked. This allows the fastener member 40 to freely spin relative to the workpiece 42 since a degree of clearance, which dimension is denoted by "I" in FIG. 6, is provided between the unthreaded portion 52 and the interior wall 56 of the aperture 54, and is needed in driving or seating the fastener 40 to complete the joint. As shown, the length E of the unthreaded portion 52 is greater than the thickness F of the workpiece 42 and thus the length of the aperture 54. Preferably, the length E of the unthreaded portion 52 is at least 1.2 times greater than the thickness F of the workpiece 42. This allows the fastener member 40 to move in an axial direction relative to the workpiece 42 within certain predetermined limits.

After the novel fastener assembly 38 of the present invention is in its preassembled configuration, it is ready to be shipped to a user. The user can attach the preassembled fastener assembly 38 to other structures, such as, for example, a panel 60, a buckle 62 and a nut 64, as shown in FIG. 5.

A significant advantage that the novel fastener assembly 38 presents is that the need for a push nut, for example 24 as shown in FIG. 1, is eliminated since the major diameter A of the threaded portion 48 is greater than the inside diameter G of the aperture 54 and a degree of interference H is created which maintains the fastener member 40 and the workpiece 42 in a preassembled configuration. Thus, the cost of providing a push nut is eliminated in the present novel invention.

Another advantage is that the shank portion 46 of the fastener member 40 is threaded before the fastener member 40 is attached to the workpiece 42 and a full size shank can be used. The full size shank makes the fastener member 40 stronger and the step of forming a thread on the fastener member after assembly which was necessary in some preassembled fastener assemblies disclosed in the prior art is eliminated.

Yet another advantage is that the aperture 54 used in the present invention does not need to be pre-threaded. Pre-threading is very expensive and since the present invention eliminates the need to pre-thread, the cost of the novel fastener assembly 38 disclosed herein is reduced.

One feature of note is that an end portion 66 of the passage or aperture 54 may be slightly rounded. The rounded end portion 66 promotes the entrance of the threaded portion 48 into the aperture 54.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A method of preassembly and mounting a fastener to a workpiece comprising the steps of:

providing a workpiece of a predetermined thickness, said workpiece including an initially unthreaded aperture therethrough, said aperture having an inside diameter of a predetermined size;

providing a fastener comprising a head portion and an elongated shank portion connected to said head portion, said shank portion having a threaded portion and an unthreaded portion, said threaded portion having a major diameter which is 5% to 30% greater than the inside diameter of the aperture in the workpiece, said unthreaded portion having an outside diameter which is less than the inside diameter of the aperture in the workpiece; and engaging said threaded portion of greater diameter with said aperture and threading said threaded portion of said fastener completely through said aperture until said unthreaded portion is housed within the aperture thereby forming partial threads on the inside of said aperture of said workpiece without materially enlarging or reducing the effective inside diameter of said aperture, such that the difference in said effective inside diameter and the major diameter of said threaded portion maintains the fastener preassembled with the workpiece.

2. A method as defined in claim 1, wherein the step of threading said threaded portion of said fastener completely through said aperture forms a purchase into said workpiece of 5% to 30% of said major diameter of said threaded portion.

3. A method as defined in claim 1, wherein said unthreaded portion of said fastener that is provided has a length which is greater than the thickness of said workpiece.

4. A method as defined in claim 3, wherein said length of said unthreaded portion is 1.2 times greater than the thickness of said workpiece.

* * * * *